United States Patent
Kasada et al.

(10) Patent No.: US 10,062,403 B1
(45) Date of Patent: Aug. 28, 2018

(54) MAGNETIC TAPE DEVICE AND HEAD TRACKING SERVO METHOD

(71) Applicant: FUJIFILM Corporation, Tokyo (JP)

(72) Inventors: Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/900,412

(22) Filed: Feb. 20, 2018

(30) Foreign Application Priority Data

Feb. 20, 2017 (JP) ................................. 2017-029496

(51) Int. Cl.
- *G11B 5/702* (2006.01)
- *G11B 5/39* (2006.01)
- *G11B 5/68* (2006.01)
- *G11B 5/84* (2006.01)

(52) U.S. Cl.
CPC ............ *G11B 5/702* (2013.01); *G11B 5/3909* (2013.01); *G11B 5/68* (2013.01); *G11B 5/84* (2013.01)

(58) Field of Classification Search
CPC ................. G11B 2005/001–2005/0018; G11B 2005/3996; G11B 5/00813–5/00826; G11B 5/29–5/3116; G11B 5/39–5/3993; G11B 5/62; G11B 5/68–5/738; G11B 5/84–5/858; G11B 2220/95–2220/956
USPC ............................ 360/55, 69, 75, 77.12, 134
See application file for complete search history.

(56) References Cited

U.S. PATENT DOCUMENTS

| | | | | |
|---|---|---|---|---|
| 6,893,746 B1* | 5/2005 | Kirino | ...................... | G11B 5/00 369/13.02 |
| 8,279,739 B2* | 10/2012 | Kanbe | .................. | G11B 5/6088 369/288 |
| 2010/0227201 A1* | 9/2010 | Sasaki | ...................... | G11B 5/70 428/839 |
| 2011/0151281 A1* | 6/2011 | Inoue | ...................... | G11B 5/70 428/846 |
| 2015/0111066 A1* | 4/2015 | Terakawa | ................. | G11B 5/70 428/836.2 |
| 2017/0337944 A1* | 11/2017 | Biskeborn | .............. | G11B 5/708 |

FOREIGN PATENT DOCUMENTS

JP 2004-185676 A 7/2004

* cited by examiner

*Primary Examiner* — Wayne Young
*Assistant Examiner* — James L Habermehl
(74) *Attorney, Agent, or Firm* — Sughrue Mion, PLLC

(57) ABSTRACT

The magnetic tape device includes a magnetic tape; and a servo head, in which the servo head is a TMR head, the magnetic tape includes a servo pattern in the magnetic layer, a center line average surface roughness Ra measured regarding a surface of the magnetic layer is equal to or smaller than 2.0 nm, a logarithmic decrement acquired by a pendulum viscoelasticity test performed regarding the surface of the magnetic layer is equal to or smaller than 0.050, and a ratio (Sdc/Sac) of an average area Sdc of a magnetic cluster of the magnetic tape in a DC demagnetization state and an average area Sac of a magnetic cluster thereof in an AC demagnetization state measured with a magnetic force microscope is 0.80 to 1.30.

10 Claims, 4 Drawing Sheets

MAGNETIC TAPE DEVICE AND HEAD TRACKING SERVO METHOD

CROSS-REFERENCE TO RELATED APPLICATIONS

This application claims priority under 35 U.S.C 119 to Japanese Patent Application No. 2017-029496 filed on Feb. 20, 2017. The above application is hereby expressly incorporated by reference, in its entirety, into the present application.

BACKGROUND OF THE INVENTION

1. Field of the Invention

The present invention relates to a magnetic tape device and a head tracking servo method.

2. Description of the Related Art

Magnetic recording is used as a method of recording information in a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head as a reproducing head for reproducing information in the magnetic disk device. On the other hand, the usage of the TMR head as a reproducing head in the magnetic tape device is currently still in a stage where the future usage thereof is expected, and the usage thereof is not yet practically realized.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure reading accuracy of the servo pattern. As a magnetic head for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

In addition, a signal-to-noise-ratio (SNR) at the time of reading the servo pattern tends to decrease in accordance with a decrease in read track width of the servo pattern. However, a decrease in SNR at the time of reading the servo pattern causes a decrease in accuracy that the magnetic head follows the data track by the head tracking servo.

Therefore, an object of the invention is to provide a magnetic tape device in which a TMR head is mounted as a servo head and a servo pattern written on a magnetic tape can be read at a high SNR.

As means for increasing the SNR at the time of reproducing information recorded on the magnetic tape, a method of increasing smoothness of a surface of a magnetic layer of a magnetic tape is used. This point is also preferable for increasing the SNR in a case of reading a servo pattern written in the magnetic tape. The inventors have made intensive studies for further increasing the SNR in a case of reading a servo pattern written in the magnetic tape, by using other methods, in addition to the method of increasing smoothness of a surface of a magnetic layer of a magnetic tape.

Meanwhile, a magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value in the TMR head is generally high, as disclosed in a paragraph 0007 of JP2004-185676A, but generation of a significant decrease in resistance value in the TMR head, while continuing the reproducing of a servo pattern with the TMR head, may cause a decrease in sensitivity of the TMR head, while continuing the head tracking servo. As a result, the accuracy of head position controlling of the head tracking servo may decrease, while continuing the head tracking servo.

During intensive studies for achieving the object described above, the inventors have found a phenomenon which was not known in the related art, in that, in a case of using the TMR head as a servo head in the magnetic tape device which performs the head tracking servo, a significant decrease in resistance value (electric resistance) occurs in the TMR head. A decrease in resistance value in the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of using the TMR head was not even confirmed in the related art. A difference in the recording and reproducing system between the magnetic disk device and the magnetic tape device, specifically, contact and non-contact between a magnetic recording medium and a magnetic head may be the reason why a significant decrease in resistance value in the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads. It is clear that, a significant decrease in resistance value in the TMR head tends to more significantly occur in a magnetic tape device in which a magnetic tape having high smoothness of a surface of a magnetic layer is mounted as the magnetic tape. With respect to this, as a result of more intensive studies after finding the phenomenon described above, the inventors have newly found that such a significant decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a servo head, in which the servo head is a magnetic head (hereinafter, also referred to as a "TMR head") including a tunnel magnetoresistance effect type element (hereinafter, also referred to as a "TMR element") as a servo pattern reading element, the magnetic tape includes a non-magnetic support, and a magnetic layer including ferromagnetic powder and a binding agent on the non-magnetic support, the magnetic layer includes a servo pattern, a center line average surface roughness Ra measured regarding a surface of the magnetic layer (hereinafter, also referred to as a "magnetic layer surface roughness Ra") is equal to or smaller than 2.0 nm, a logarithmic decrement acquired by a pendulum viscoelasticity test performed regarding the surface of the magnetic layer (hereinafter, also simply referred to as a "logarithmic decrement") is equal to or smaller than 0.050, and a ratio of an average area Sdc of a magnetic cluster of the magnetic tape in a DC demagnetization state and an average area Sac of a magnetic cluster of the magnetic tape in an AC demagnetization state measured with a magnetic force microscope (Sdc/Sac; hereinafter, also referred to as a "magnetic cluster area ratio Sdc/Sac") is 0.80 to 1.30.

According to another aspect of the invention, there is provided a head tracking servo method comprising: reading a servo pattern of a magnetic layer of a magnetic tape by a servo head in a magnetic tape device, in which the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer (magnetic layer surface roughness Ra) is equal to or smaller than 2.0 nm, a logarithmic decrement acquired by a pendulum viscoelasticity test performed regarding the surface of the magnetic layer is equal to or smaller than 0.050, and a ratio of an average area Sdc of magnetic clusters of the magnetic tape in a DC demagnetization state and an average area Sac of magnetic clusters thereof in an AC demagnetization state measured with a magnetic force microscope (Sdc/Sac) is 0.80 to 1.30.

One aspect of the magnetic tape device and the head tracking servo method is as follows.

In one aspect, the logarithmic decrement is 0.010 to 0.050.

In one aspect, the center line average surface roughness Ra measured regarding the surface of the magnetic layer is 1.2 nm to 2.0 nm.

In one aspect, the magnetic tape includes a non-magnetic layer including non-magnetic powder and a binding agent between the non-magnetic support and the magnetic layer.

According to one aspect of the invention, it is possible to perform the reading at a high SNR, in a case of reading a servo pattern of the magnetic layer of the magnetic tape with the TMR head and prevent occurrence of a significant decrease in resistance value in the TMR head.

DESCRIPTION OF THE PREFERRED EMBODIMENTS

Magnetic Tape Device

Figure 1:
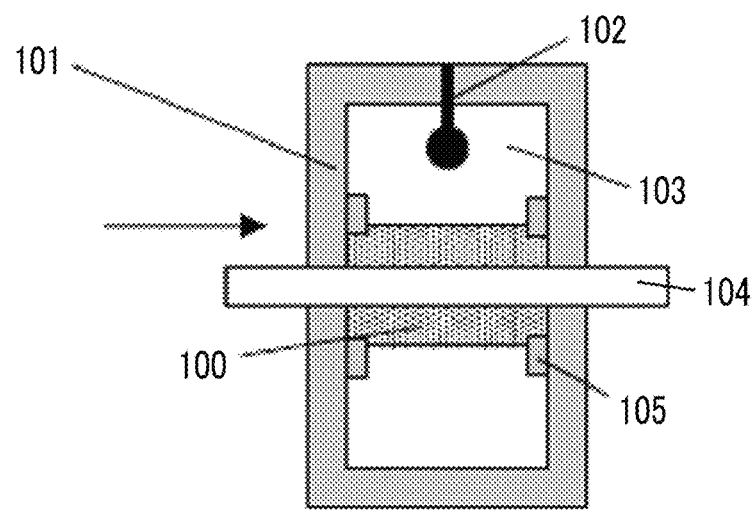
FIG. 1 is an explanatory diagram of a measurement method of a logarithmic decrement.

One aspect of the invention relates to a magnetic tape device including: a magnetic tape; and a servo head, in which the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer (magnetic layer surface roughness Ra) is equal to or smaller than 2.0 nm, a logarithmic decrement acquired by a pendulum viscoelasticity test performed regarding the surface of the magnetic layer is equal to or smaller than 0.050, and a ratio of an average area Sdc of magnetic clusters of the magnetic tape in a DC demagnetization state and an average area Sac of magnetic clusters thereof in an AC demagnetization state measured with a magnetic force microscope (Sdc/Sac) is 0.80 to 1.30.

The inventors have thought that the magnetic layer surface roughness Ra and the magnetic cluster area ratio Sdc/Sac set to be in the ranges described above contribute to the reading of a servo pattern written in the magnetic layer of the magnetic tape in the magnetic tape device at a high SNR, and logarithmic decrement set to be in the range described above contributes to the prevention of a significant decrease in resistance value in the TMR head.

The magnetic layer surface roughness Ra equal to or smaller than 2.0 nm can contribute to a decrease in spacing loss causing a decrease in SNR. In addition, the magnetic cluster area ratio Sdc/Sac of 0.80 to 1.30 also contribute to improvement of the SNR. It is thought that magnetic cluster area ratio Sdc/Sac is a value which may be an index for a state of ferromagnetic powder present in the magnetic layer. It is surmised that, a state in which the magnetic cluster area ratio Sdc/Sac is 0.80 to 1.30 is a state in which aggregation of particles of ferromagnetic powder is prevented in the magnetic layer, and such a state contributes to the reading of a servo pattern written in the magnetic layer at a high SNR.

The above description is a surmise of the inventors regarding the reading of a servo pattern written in the magnetic layer of the magnetic tape at a high SNR, in the magnetic tape device. The inventors have thought regarding the usage of the TMR head by preventing the occurrence of a significant decrease in resistance value, in the magnetic tape.

In the magnetic tape device, in a case of using a magnetic tape of the related art, in a case of using a TMR head as a servo head for performing head tracking servo at the time of recording and/or reproducing information, a phenomenon in which a resistance value (electric resistance) significantly decreases in the TMR head occurs. This phenomenon is a phenomenon that has been newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reading a servo pattern formed in the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reading a servo pattern formed in the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurred even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, the magnetic tape and the servo head come into contact with each other and slide on each other, in a case of reading a servo pattern by the servo head. Accordingly, in a case where any measures are not prepared, the TMR head is damaged due to the sliding between the TMR head and the magnetic tape, and thus, short circuit easily occurs. The inventors have assumed that this is the reason why a decrease in resistance value of the TMR head significantly occurs, in a case of using the TMR head as the servo head in the magnetic tape device. In addition, it is thought that, in a case where the smoothness of the surface of the magnetic layer of the magnetic tape increases, a contact area (so-called real contact area) between the surface of the magnetic layer and the servo head increases. It is thought that the servo head which is more easily damaged at the time of sliding on the magnetic tape due to an increase in contact area, is a reason a decrease in resistance value in the TMR head which tends to be significant, in the magnetic tape device in which the magnetic tape having high smoothness of the surface of the magnetic layer is mounted.

With respect to this, as a result of intensive studies of the inventors, the inventors have newly found that it is possible to prevent a phenomenon in which a decrease in resistance value of the TMR head occurs significantly, in a case of using the TMR head as a servo head in the magnetic tape device, by using the magnetic tape in which a logarithmic decrement acquired by a pendulum viscoelasticity test performed regarding the surface of the magnetic layer is equal to or smaller than 0.050. This point will be further described below.

In the invention and the specification, the magnetic layer side logarithmic decrement is a value acquired by the following method.

Figure 2:
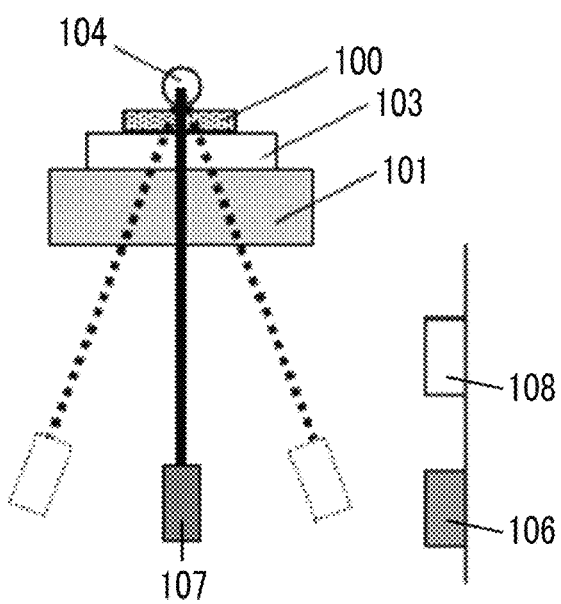
FIG. 2 is an explanatory diagram of the measurement method of a logarithmic decrement.
Figure 3:
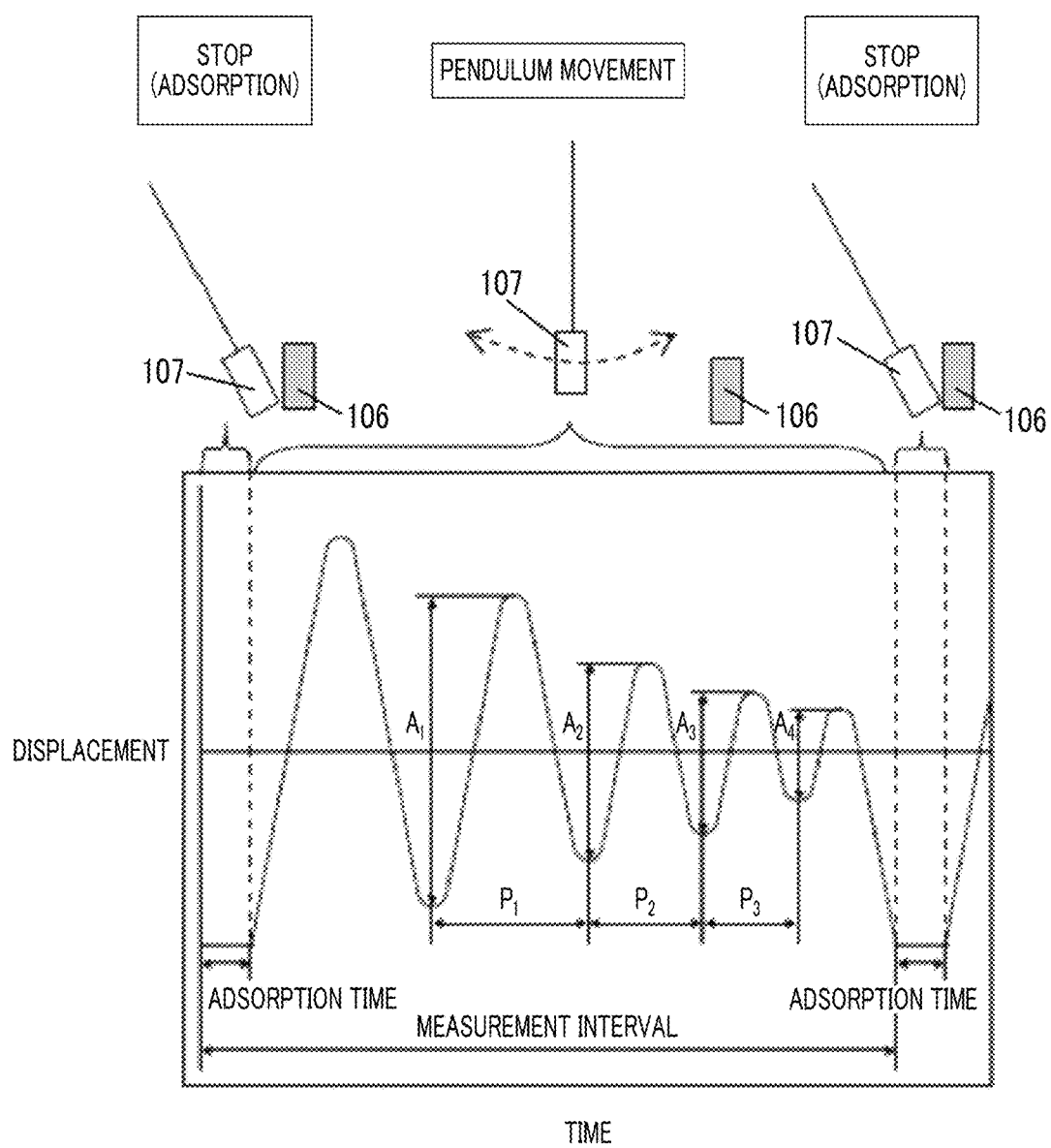
FIG. 3 is an explanatory diagram of the measurement method of a logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In the invention and the specification, the description regarding "parallel" includes a range of errors allowed in the technical field of the invention. For example, the range of errors means a range of less than ±10° from an exact parallel state, and the error from the exact parallel state is preferably within ±5° and more preferably within ±3°. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement A (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the magnetic layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The inventors have considered that the logarithmic decrement is an index for the amount of pressure sensitive adhesive components separated from the magnetic tape, in a case where the TMR head comes into contact with the magnetic tape and slides on the magnetic tape, and interposed between the magnetic tape and the TMR head. The inventors have considered that, as a larger amount of the pressure sensitive adhesive components is present, adhesiveness between the magnetic tape and the TMR head increases, and this disturb smooth sliding between the magnetic tape and the TMR head (sliding properties are deteriorated). With respect to this, the inventors have considered that, in the magnetic tape included in the magnetic tape device, a state where the logarithmic decrement is equal to or smaller than 0.050, that is, a state where the amount of the pressure sensitive adhesive components is decreased contributes to smooth sliding between the magnetic tape and the TMR head. As a result, the inventors have surmised that it is possible to prevent occurrence of short circuit due to damage on the TMR head due to the sliding on the magnetic tape having the magnetic layer surface roughness Ra of 2.0 nm and excellent smoothness of the surface of the magnetic layer.

The details of the pressure sensitive adhesive components are not clear. The inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have surmised that the binding agent component having a low molecular weight which is separated from the magnetic tape at the time of sliding between the magnetic tape and the TMR head and interposed between the magnetic tape and the TMR head may cause a decrease in sliding properties. The inventors have surmised that, the binding agent component having a low molecular weight may have pressure sensitive adhesive properties and the logarithmic decrement acquired by a pendulum viscoelasticity test may be an index for the amount of binding agent components having a low molecular weight separated from the magnetic tape at the time of the sliding between the magnetic tape and the TMR head. In one aspect, the magnetic layer is formed by applying a magnetic layer forming composition including a curing agent in addition to ferromagnetic powder and a binding agent onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer may be one of reasons for that the binding agent component having a low molecular weight is interposed between the magnetic tape and the TMR head at the time of the sliding between the magnetic tape and the TMR head.

However, the above-mentioned description is merely a surmise of the inventors and the invention is not limited thereto.

Hereinafter, the magnetic tape device will be described more specifically. A "decrease in resistance value of the TMR head" described below is a significant decrease in resistance value of the TMR head occurring in a case of reading a servo pattern using the TMR head, in the magnetic tape device in which the TMR head is mounted as a servo head, otherwise not noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

Magnetic Tape

Magnetic Layer Surface Roughness Ra

The center line average surface roughness Ra measured regarding the surface of the magnetic layer of the magnetic tape (magnetic layer surface roughness Ra) is equal to or smaller than 2.0 nm. This point can contribute to the reading of the servo pattern a high SNR in the magnetic tape device. From a viewpoint of further increasing the SNR, the magnetic layer surface roughness Ra is preferably equal to or smaller than 1.9 nm, more preferably equal to or smaller than 1.8 nm, even more preferably equal to or smaller than 1.7 nm, still preferably equal to or smaller than 1.6 nm, and still more preferably equal to or smaller than 1.5 nm. In addition, the magnetic layer surface roughness Ra can be, for example, equal to or greater than 1.0 nm or equal to or greater than 1.2 nm. However, from a viewpoint of increasing the SNR, a low magnetic layer surface roughness Ra is preferable, and thus, the magnetic layer surface roughness Ra may be lower than the lower limit exemplified above.

The center line average surface roughness Ra measured regarding the surface of the magnetic layer of the magnetic tape in the invention and the specification is a value measured with an atomic force microscope (AFM) in a region having an area of 40 µm×40 µm of the surface of the magnetic layer. As an example of the measurement conditions, the following measurement conditions can be used. The magnetic layer surface roughness Ra shown in examples which will be described later is a value obtained by the measurement under the following measurement conditions. In the invention and the specification, the "surface of the magnetic layer" of the magnetic tape is identical to the surface of the magnetic tape on the magnetic layer side.

The measurement is performed regarding the region of 40 µm×40 µm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 µm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain a magnetic tape having the magnetic layer surface roughness Ra equal to or smaller than 2.0 nm.

Logarithmic Decrement

The logarithmic decrement acquired by a pendulum viscoelasticity test performed regarding the surface of the magnetic layer of the magnetic tape is equal to or smaller than 0.050. Accordingly, it is possible to prevent a decrease in resistance value of the TMR head. The logarithmic decrement is preferably equal to or smaller than 0.048, more preferably equal to or smaller than 0.045, and even more preferably equal to or smaller than 0.040, from a viewpoint of further preventing a decrease in resistance value of the TMR head. Meanwhile, from a viewpoint of preventing a decrease in resistance value of the TMR head, it is preferable that the logarithmic decrement is low, and thus, a lower limit value is not particularly limited. The logarithmic decrement can be, for example, equal to or greater than 0.010 or equal to or greater than 0.015. However, the logarithmic decrement may be smaller than the exemplified value. A specific aspect of a method for adjusting the logarithmic decrement will be described later.

Magnetic Cluster Area Ratio Sdc/Sac

The magnetic cluster area ratio Sdc/Sac of the magnetic tape is 0.80 to 1.30. It is thought that the magnetic cluster area ratio Sdc/Sac is a value which may be an index showing a state of ferromagnetic powder present in the magnetic layer. Specifically, in the magnetic layer of the magnetic tape in the AC demagnetization state, each ferromagnetic particle faces a random direction and the total amount of magnetization is close to zero. Accordingly, each ferromagnetic particle can be substantially present in a state of a primary particle. Thus, a size of the magnetic cluster in the AC demagnetization state (specifically, average area Sac which will be described later in detail) can be a value which does not vary depending on an aggregation state of ferromagnetic particles of the magnetic layer. Meanwhile, a size of the magnetic cluster in the DC demagnetization (a degree of a magnetic field was set as zero, after applying DC magnetic field) state (specifically, average area Sdc which will be described later in detail) corresponds to a size of an aggregate of the ferromagnetic particles and varies depending on a degree of aggregation of the ferromagnetic particles in the magnetic layer. As the ferromagnetic particles are aggregated, the value thereof tends to increase. Therefore, it is thought that a small difference between the Sdc and Sac means that the aggregation of the particles of the ferromagnetic powder is prevented. For details of this point, a description disclosed in paragraphs 0014 to 0017 of JP2007-294084A can be referred to, for example. It is thought that the magnetic cluster area ratio Sdc/Sac which is 0.80 to 1.30 contributes to an increase in SNR at the time of reading a servo pattern written in the magnetic layer by the TMR head. From a viewpoint of further increasing the SNR, the magnetic cluster area ratio Sdc/Sac is preferably equal to or smaller than 1.28, more preferably equal to or smaller than 1.25, even more preferably equal to or smaller than 1.20, still preferably equal to or smaller than 1.15, still more preferably equal to or smaller than 1.10, still even more preferably equal to or smaller than 1.05, and still further more preferably equal to or smaller than 1.00. A lower limit of the measurement value of the magnetic cluster area ratio Sdc/Sac is 0.80 as known in the related art (for example, see a paragraph 0018 of JP2007-294084A).

The magnetic cluster area ratio Sdc/Sac of the invention and the specification is a value obtained by the following method by measurement performed using a magnetic force microscope (MFM).

Two samples cut out from the same magnetic tape are prepared. One sample is used for measuring the Sac by performing the AC demagnetization and the other sample is used for measuring the Sdc by allowing the DC demagnetization.

The Sac is a value obtained by the following method.

With a magnetic force microscope, a magnetic force image is obtained in a square area having a length of a side of 5 µm (5 µm×5 µm) of a surface of a magnetic layer of the sample regarding which demagnetization is performed in the alternating magnetic field (alternating current (AC) demagnetization). An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sac.

The Sdc is a value obtained by the following method.

The sample was subjected to direct current (DC) demagnetization at applying magnetic field of 796 kA/m (10 kOe), and then, a magnetic force image having a square area having a length of a side of 5 µm (5 µm×5 µm) of the sample subjected to the DC demagnetization is obtained by using a magnetic force microscope. An area of the magnetic force image is calculated after performing noise removing and hole filling treatment regarding the obtained magnetic force image, by using well-known image analysis software. The above operation is performed with respect to magnetic force images of arbitrarily selected 10 different points of the surface of the magnetic layer, and an arithmetical mean (average area) of the areas of the magnetic force image is calculated. The average area calculated as described above is set as the Sdc.

The ratio of the Sdc and Sac obtained as described above (Sdc/Sac) is set as the magnetic cluster area ratio Sdc/Sac.

The obtaining of the magnetic force image with a magnetic force microscope is performed by using a commercially available magnetic force microscope or a magnetic force microscope having a well-known configuration in a frequency modulation (FM) mode. As a probe of the magnetic force microscope, SSS-MFMR (nominal radius of curvature of 15 nm) manufactured by Nano World AG can be used, for example. A distance between the surface of the magnetic layer and a distal end of the probe at the time of the magnetic force microscope observation is 20 to 50 nm. In addition, well-known analysis software or analysis software using a well-known arithmetic expression can be used as the image analysis software.

The magnetic cluster area ratio Sdc/Sac can be controlled to be 0.80 to 1.30 by preventing the aggregation of the ferromagnetic particles of the magnetic layer. As a method for preventing the aggregation, the following method can be used, for example.

As a binding agent included in the magnetic layer, a binding agent having high affinity with a solvent used in preparation of a magnetic layer forming composition is used.

Dispersion conditions at the time of preparing the magnetic layer forming composition are adjusted.

A process for crushing aggregation of ferromagnetic particles is performed after arbitrarily applying the magnetic layer forming composition onto the non-magnetic support through a non-magnetic layer.

For the above point and other controlling methods, descriptions disclosed in paragraphs 0012 and 0032 and examples of JP4001532B, and paragraphs 0024 to 0026, 0028, 0029, 0105 and 0106, and examples of JP2007-294084A can be referred to, for example.

In addition, regarding ferromagnetic powder having low saturation magnetization σs, ferromagnetic particles configuring the ferromagnetic powder are hardly aggregated, and even in a case where the ferromagnetic particles are aggregated, the aggregation tends to be easily crushed. Accordingly, a method of forming a magnetic layer by using ferromagnetic powder having low saturation magnetization σs can be a method of controlling the magnetic cluster area ratio Sdc/Sac.

For example, the magnetic cluster area ratio Sdc/Sac can be controlled to be 0.80 to 1.30 by arbitrarily combining one or two or more various methods described above.

In one aspect, the Sdc and Sac are respectively preferably 3,000 to 50,000 $nm^2$, more preferably 3,000 to 35,000 $nm^2$, and even more preferably 3,000 to 20,000 $nm^2$. The Sdc and Sac are respectively preferably equal to or greater than 3,000 $nm^2$, from a viewpoint of stability of magnetization, and are respectively preferably equal to or smaller than 50,000 $nm^2$, from a viewpoint of increasing resolution at the time of high-density recording. The Sac can be controlled by using the average particle size of the ferromagnetic powder used for forming the magnetic layer, and the Sdc can be controlled by preventing aggregation of the ferromagnetic particles of the magnetic layer. The method of preventing the aggregation is as described above.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. In addition, as described above, it is preferable to use a binding agent having high affinity with a solvent, from a viewpoint of preventing aggregation of the ferromagnetic particles of the magnetic layer.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the non-magnetic filler such as an abrasive in the magnetic layer forming composition, in order to decrease the magnetic layer surface roughness Ra.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.00 to 6.00 μm.

A thickness of the magnetic layer is preferably equal to or smaller than 0.15 μm and more preferably equal to or smaller than 0.10 μm, from a viewpoint of realization of high-density recording required in recent years. The thickness of the magnetic layer is even more preferably 0.01 to 0.10 μM. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.80 μm, more preferably equal to or smaller than 1.50 μm, and even more preferably equal to or smaller than 1.10 μm, from a viewpoint of thinning the magnetic tape. In addition, the total thickness of the magnetic layer and the non-magnetic layer can be, for example, equal to or greater than 0.10 μm.

A thickness of the back coating layer is preferably equal to or smaller than 0.90 μm and even more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm can be used, for example. In addition, as described above, it is also preferable that the dispersion conditions for controlling the magnetic cluster area ratio Sdc/Sac are adjusted. An increase in dispersion time, a decrease in diameter of dispersion beads used in the dispersion, an increase in filling percentage of the dispersion beads, and the like are preferable, from a viewpoint of preventing aggregation of the ferromagnetic particles of the magnetic layer. For details of the manufacturing method of the magnetic tape, a description disclosed in paragraphs 0051 to 0057 of JP2010-24113A can also be referred to.

Coating Step, Cooling Step, Heating and Drying Step, Burnishing Treatment Step, and Curing Step The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, a magnetic layer can be formed through a magnetic layer forming step including a coating step of applying a magnetic layer forming composition including ferromagnetic powder, a binding agent, a curing agent, and a solvent onto a non-magnetic support directly or with another layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

The inventors have thought that it is preferable that the cooling step and the burnishing treatment step in the magnetic layer forming step, in order to set the logarithmic decrement to be equal to or smaller than 0.050. More specific description is as follows.

The inventors have surmised that performing the cooling step of cooling the coating layer between the coating step and the heating and drying step contributes to causing pressure sensitive adhesive component separated from the magnetic tape (specifically, surface of the magnetic layer) in a case where the TMR head comes into contact with and slides on the magnetic tape, to be localized in the surface and/or a surface layer part in the vicinity of the surface of the coating layer. The inventors have surmised that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component contributes setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method of the magnetic tape will be described with reference to FIG. 4. However, the invention is not limited to the following specific aspect.

Figure 4:
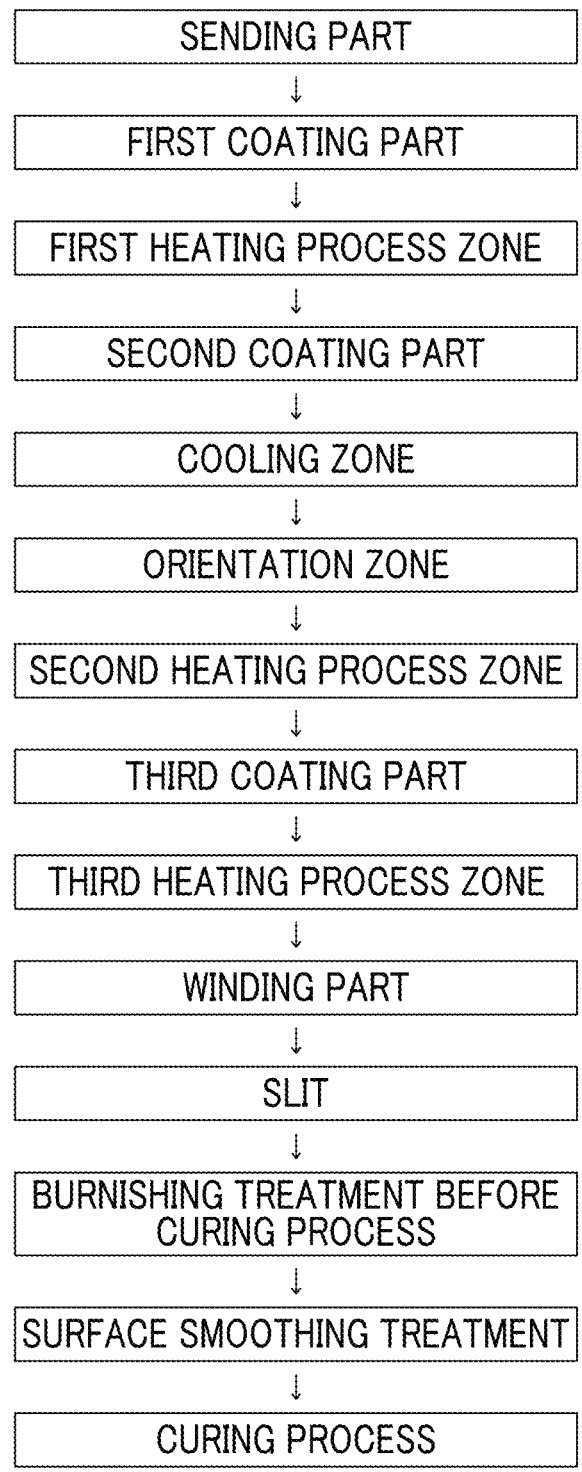
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic recording medium, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably $-10°$ C. to 0° C. and more preferably $-5°$ C. to 0° C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, in the aspect of performing the orientation process, while the coating layer of the magnetic layer forming composition is wet, an orientation process is performed with respect to the coating layer in an orientation zone. For the orientation process, a description disclosed in a paragraph 0052 of JP2010-24113A can be referred to. In addition, in one aspect, a process for preventing the aggregation of the ferromagnetic particles included in the coating layer can be performed before and/or after the orientation process. As an example of such a process, a smoothing process can be used. The smoothing process is a process of applying shear to the coating layer by a smoother.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.050. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above. This point was newly found by the inventors.

The burnishing treatment can be preferably performed by performing one or both of rubbing of the surface of the coating layer of the treatment target by a polishing tape (polishing) and rubbing of the surface of the coating layer of the treatment target by a grinding tool (grinding). In a case where the magnetic layer forming composition includes an abrasive, it is preferable to use a polishing tape including at least one of an abrasive having higher Mohs hardness than that of the abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 4, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the magnetic layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

As described above, it is possible to obtain a magnetic tape included in the magnetic tape device according to one aspect of the invention. However, the manufacturing method described above is merely an example, the logarithmic decrement, the magnetic cluster area ratio Sdc/Sac, and the magnetic layer surface roughness Ra can be controlled to be in respective ranges described above by an arbitrary method capable of adjusting the logarithmic decrement, the magnetic cluster area ratio Sdc/Sac, and the magnetic layer surface roughness Ra and such an aspect is also included in the invention.

Formation of Servo Pattern

A servo pattern is formed in the magnetic layer by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of a servo pattern is performed by the servo head. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Servo Head

The magnetic tape device includes the TMR head as the servo head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in resistance value (electric resistance) tends to become significant at the time of reading a servo pattern written in the magnetic layer of magnetic tape including the magnetic layer having the magnetic layer surface roughness Ra equal to or smaller than 2.0 nm. However, such a significant decrease in resistance value can be prevented by setting the logarithmic decrement to be equal to or smaller than 0.050, in the magnetic tape in which the magnetic layer surface roughness Ra is equal to or smaller than 2.0 nm.

In one preferred aspect, in the magnetic tape device, it is possible to perform the head tracking servo by using the TMR head as the servo head in a case of recording information on the magnetic layer having a servo pattern at linear recording density equal to or greater than 250 kfci and/or reproducing information recorded. The unit, kfci, is a unit of linear recording density (not able to convert to the SI unit system). The linear recording density can be, for example, 250 to 800 kfci and can also be 300 to 800 kfci. The linear recording density can be, for example, equal to or smaller than 800 kfci and can also exceed 800 kfci. In the magnetic tape for high-density recording, a width of the servo band tends to decrease, in order to provide a large amount of data bands in the magnetic layer, and thus, the SNR at the time of reading a servo pattern easily decrease. However, a decrease in SNR can be prevented by setting the magnetic layer surface roughness Ra and the magnetic cluster area ratio Sdc/Sac of the magnetic tape in the magnetic tape device to be in the ranges described above.

The servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

As the magnetic tape is transported at a high speed in the magnetic tape device, it is possible to shorten the time for recording information and/or the time for reproducing information. Meanwhile, it is desired that the magnetic tape is transported at a low speed at the time of recording and reproducing information, in order to prevent a deterioration in recording and reproducing characteristics. From the viewpoint described above, in a case of reading a servo pattern by the servo head in order to perform head tracking servo at the time of recording and/or reproducing information, a magnetic tape transportation speed is preferably equal to or lower than 18 m/sec, more preferably equal to or lower than 15 m/sec, and even more preferably equal to or lower than 10 m/sec. The magnetic tape transportation speed can be, for example, equal to or higher than 1 m/sec. The magnetic tape transportation speed is also referred to as a running speed. In the invention and the specification, the "magnetic tape transportation speed" is a relative speed between the magnetic tape transported in the magnetic tape device and the servo head in a case where the servo pattern is read by the servo head. The magnetic tape transportation speed is normally set in a control unit of the magnetic tape device. As the magnetic tape transportation speed is low, the time for which the same portion of the TMR head comes into contact with the magnetic tape increases at the time of reading the servo pattern, and accordingly, damage on the TMR head more easily occurs and a decrease in resistance value easily occurs. In the magnetic tape device according to one aspect of the invention, such a decrease in resistance value can be prevented by using a magnetic tape having the logarithmic decrement equal to or smaller than 0.050.

Head Tracking Servo Method

One aspect of the invention relates to a head tracking servo method including: reading a servo pattern of a magnetic layer of a magnetic tape by a servo head in a magnetic tape device, in which the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, a logarithmic decrement acquired by a pendulum viscoelasticity test performed regarding the surface of the magnetic layer is equal to or smaller than 0.050, and a ratio of an average area Sdc of magnetic clusters of the magnetic tape in a DC demagnetization state and an average area Sac of magnetic clusters thereof in an AC demagnetization state measured with a magnetic force microscope (Sdc/Sac) is 0.80 to 1.30. The reading of the servo pattern is performed by bringing the magnetic tape into contact with the servo head allowing sliding while transporting (causing running of) the magnetic tape. The details of the magnetic tape and the servo head used in the head tracking servo method are as the descriptions regarding the magnetic tape device according to one aspect of the invention.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 5:
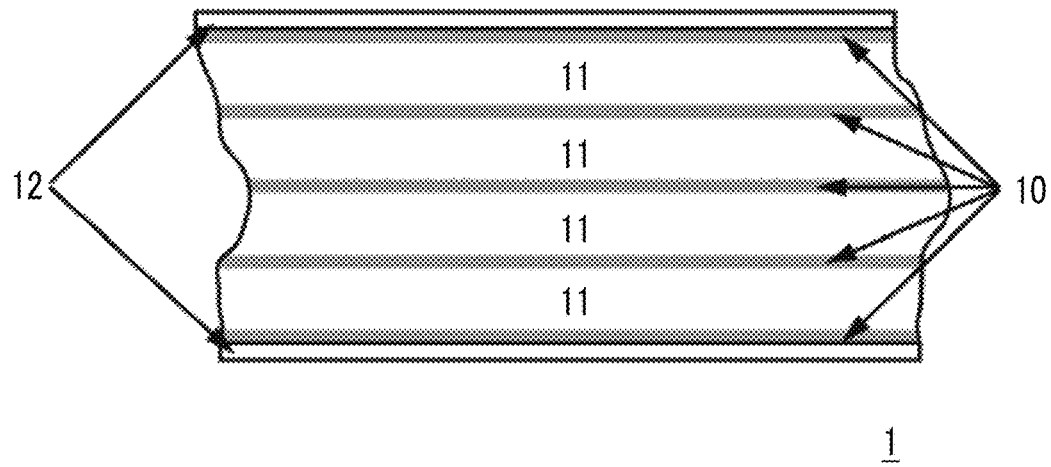
FIG. 5 shows an example of disposition of data bands and servo bands.
Figure 6:
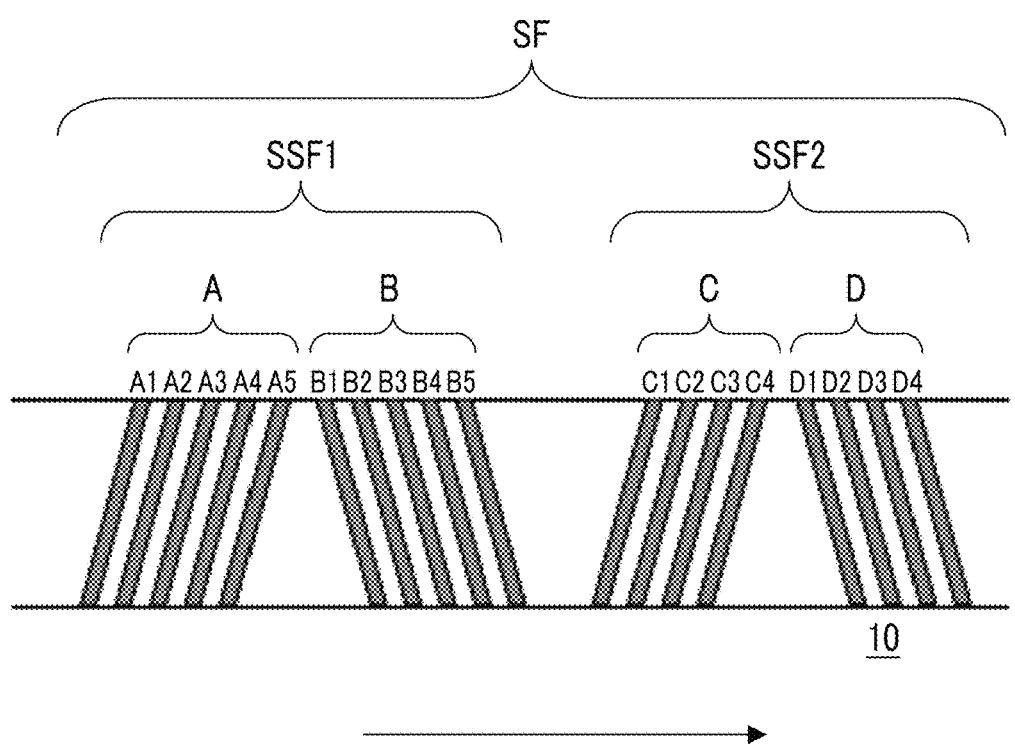
FIG. 6 shows a servo pattern disposition example of a linear-tape-open (LTO) Ultrium format tape.

FIG. 5 shows an example of disposition of data bands and servo bands. In FIG. 5, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 6 are formed on a servo band in a case of manufacturing a magnetic tape. Specifically, in FIG. 6, a servo frame SF on the servo band 10 is configured with a servo sub-frame 1 (SSF1) and a servo sub-frame 2 (SSF2). The servo sub-frame 1 is configured with an A burst (in FIG. 6, reference numeral A) and a B burst (in FIG. 6, reference numeral B). The A burst is configured with servo patterns A1 to A5 and the B burst is configured with servo patterns B1 to B5. Meanwhile, the servo sub-frame 2 is configured with a C burst (in FIG. 6, reference numeral C) and a D burst (in FIG. 6, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 6 shows one servo frame for explaining. However, in practice, in the magnetic layer of the magnetic tape in which the head tracking servo in the timing-based servo system is performed, a plurality of servo frames are disposed in each servo band in a running direction. In FIG. 6, an arrow shows the running direction. For example, a LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 6, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 5 and 6, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, a magnetic tape used in a magnetic tape device in which a TMR head is used as a servo head, the magnetic tape including: a magnetic layer including ferromagnetic powder and a binding agent on a non-magnetic support, in which the magnetic layer includes a servo pattern, a center line average surface roughness Ra measured regarding a surface of the magnetic layer is equal to or smaller than 2.0 nm, a logarithmic decrement acquired by a pendulum viscoelasticity test performed regarding the surface of the magnetic layer is equal to or smaller than 0.050, and a ratio of an average area Sdc of magnetic clusters of the magnetic tape in a DC demagnetization state and an average area Sac of magnetic clusters thereof in an AC demagnetization state measured with a magnetic force microscope (Sdc/Sac) is 0.80 to 1.30, is also provided. The details of the magnetic tape are also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Example 1

1. Manufacturing of Magnetic Tape
(1) Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic hexagonal barium ferrite powder: 100.0 parts
   Average particle size and saturation magnetization as: see Table 1
   Polyurethane resin A: see Table 1
   Cyclohexanone: 150.0 parts
   Methyl ethyl ketone: 150.0 parts
Abrasive Liquid
   Alumina dispersion prepared in the section (1): 6.0 parts
Silica Sol
   Colloidal silica: 2.0 parts
   Average particle size: see Table 1
   Methyl ethyl ketone: 1.4 parts
Other Components
   Stearic acid: 2.0 parts
   Stearic acid amide: 0.2 parts
   Butyl stearate: 2.0 parts
   Polyisocyanate (CORONATE (registered trademark) L manufactured by Nippon Polyurethane Industry Co., Ltd.): 2.5 parts
Finishing Additive Solvent
   Cyclohexanone: 200.0 parts
   Methyl ethyl ketone: 200.0 parts (3) Non-Magnetic Layer Forming Composition List Non-magnetic inorganic powder: α-iron oxide: 100.0 parts
  Average particle size (average long axis length): 0.15 μm
  Average acicular ratio: 7
  BET specific surface area: 52 m²/g
Carbon black: 20.0 parts
  Average particle size: 20 nm
A vinyl chloride copolymer: 13.0 parts
SO₃Na group-containing polyurethane resin: 9.0 parts
  Weight-average molecular weight: 70,000, SO₃Na group: 0.2 meq/g
Phenylphosphonic acid: 3.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts (4) Back Coating Layer Forming Composition List Non-magnetic inorganic powder: α-iron oxide: 80.0 parts
  Average particle size (average long axis length): 0.15 μm
  Average acicular ratio: 7
  BET specific surface area: 52 m²/g
Carbon black: 20.0 parts
  Average particle size: 20 nm
A vinyl chloride copolymer: 13.0 parts
SO₃Na group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts (5) Preparation of Each Layer Forming Composition The magnetic layer forming composition was prepared by the following method.

The magnetic solution was prepared by dispersing (beads-dispersing) each component by using a batch type vertical sand mill for 24 hours. Zirconia beads having a bead diameter of 0.1 mm were used as the dispersion beads. The prepared magnetic solution and the abrasive liquid were mixed with other components (silica sol, other components, and finishing additive solvent) and beads-dispersed for 5 minutes by using the sand mill, and the treatment (ultrasonic dispersion) was performed with a batch type ultrasonic device (20 kHz, 300 W) for 0.5 minutes. After that, the obtained mixed liquid was filtered by using a filter having a hole diameter of 0.5 μm, and the magnetic layer forming composition was prepared.

The non-magnetic layer forming composition was prepared by the following method. Each component excluding the lubricant (stearic acid, stearic acid amide, and butyl stearate), cyclohexanone, and methyl ethyl ketone was dispersed by using a batch type vertical sand mill for 24 hours to obtain dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method. Each component excluding the lubricant (stearic acid and butyl stearate), polyisocyanate, and cyclohexanone was kneaded and diluted by an open kneader. Then, the obtained mixed liquid was subjected to a dispersing process of 12 passes, with a transverse beads mill dispersing device by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

A magnetic tape was manufactured by the specific aspect shown in FIG. 4. The magnetic tape was specifically manufactured as follows.

A support made of polyethylene naphthalate having a thickness of 5.00 μm was sent from the sending part, and the non-magnetic layer forming composition prepared in the section (5) (ii) was applied to one surface thereof so that the thickness after the drying becomes 1.00 μm in the first coating part and was dried in the first heating process zone (atmosphere temperature of 100° C.) to form a coating layer.

Then, the magnetic layer forming composition was applied onto the non-magnetic layer so that the thickness after the drying becomes 70 nm (0.07 μm) in the second coating part, and a coating layer was formed. The cooling step was performed by passing the formed coating layer through the cooling zone in which the atmosphere temperature is adjusted to 0° C. for the staying time shown in Table 1 while the coating layer is wet, and then, the smoothing process was performed with respect to the coating layer. The smoothing process was performed by applying shear to the coating layer using a commercially available solid smoother (center line average surface roughness (catalogue value): 1.2 nm). After that, a homeotropic alignment process was performed in the orientation zone by applying a magnetic field having a magnetic field strength of 0.3 T in a vertical direction with respect to the surface of the coating layer, and the coating layer was dried in the second heating process zone (atmosphere temperature of 100° C.).

After that, in the third coating part, the back coating layer forming composition was applied to the surface of the support made of polyethylene naphthalate on a side opposite to the surface where the non-magnetic layer and the magnetic layer are formed, so that the thickness after the drying becomes 0.40 μm, to form a coating layer, and the formed coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Corporation, abrasive: diamond/ Cr₂O₃/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) shown in Table 1.

After that, a heating process (curing process) was performed in the environment of the atmosphere temperature of 70° C. for 36 hours.

By doing so, a magnetic tape for forming a servo pattern on the magnetic layer was manufactured.

In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer of the manufactured magnetic tape is acquired by the following method, and it was confirmed that the thicknesses obtained is the method described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure an SNR and a resistance value of the TMR head which will be described later.

2. Evaluation of Physical Properties of Ferromagnetic Powder (1) Average Particle Size of Ferromagnetic Powder An average particle size of the ferromagnetic powder was obtained by the method described above.

(2) Saturation Magnetization Us of Ferromagnetic Powder

The saturation magnetization as of the ferromagnetic powder was measured with an applied magnetic field of 796 kA/m (10 kOe) by using an oscillation sample type magnetic-flux meter (manufactured by Toei Industry Co., Ltd.).

The evaluation was performed in Examples and Comparative Examples which will be described later in the same manner as described above.

3. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(2) Measurement of Logarithmic Decrement

The logarithmic decrement of the surface of the magnetic layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(3) Magnetic Cluster Area Ratio Sdc/Sac

The Sdc and Sac were obtained by the method described above and the magnetic cluster area ratio Sdc/Sac was calculated from the obtained values. As a magnetic force microscope, Dimension 3100 manufactured by Bruker in a frequency modulation mode was used, and as a probe, SSS-MFMR (nominal radius of curvature of 15 nm) manufactured by NanoWorld AG was used. A distance between the surface of the magnetic layer and a distal end of the probe at the time of the magnetic force microscope observation is 20 nm. As image analysis software, MATLAB manufactured by Math Works was used.

4. Measurement of SNR

The servo head of the servo tester was replaced with a commercially available TMR head (element width of 70 nm) as a reproducing head for HDD. The reading of a servo pattern was performed by attaching the magnetic tape manufactured in the section 1. to the servo tester, and the SNR was obtained as a ratio of the output and noise. The SNR was calculated as a relative value by setting the SNR measured as 0 dB in Comparative Example 1 which will be described later. In a case where the SNR calculated as described above is equal to or greater than 7.0 dB, it is possible to evaluate that a function of dealing with future needs accompanied with high-density recording is obtained.

5. Measurement of Resistance Value of Servo Head

The servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as 4 m/sec. The servo head was moved in a width direction of the magnetic tape by 2.5 μm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 9 and Comparative Examples 1 to 10

1. Manufacturing of Magnetic Tape

A magnetic tape was manufactured in the same manner as in Example 1, except that various conditions shown in Table 1 were changed as shown in Table 1.

As the polyurethane resin A shown in Table 1, a polyurethane resin A used in examples of JP4001532B is used.

As the polyurethane resin B shown in Table 1, a polyurethane resin B used in comparative examples of JP4001532B is used.

As the vinyl chloride resin shown in Table 1, MR-110 manufactured by Zeon Corporation is used.

The polyurethane resin A is a binding agent having higher affinity with the solvent used in the preparation of the magnetic layer forming composition, compared to the polyurethane resin B and the vinyl chloride resin.

In Table 1, in the comparative examples in which "not performed" is disclosed in a column of the cooling zone staying time and a column of the burnishing treatment before the curing process, a magnetic tape was manufactured by a manufacturing step not including a cooling zone in the magnetic layer forming step and not performing the burnishing treatment and the wiping treatment before the curing process.

In Table 1, in the examples and the comparative examples in which "performed" is disclosed in a column of the smoothing process, the smoothing process was used in the same manner as in Example 1. In the comparative examples in which "not performed" is disclosed in a column of the smoothing process, the magnetic tape was manufactured by a manufacturing step in which the smoothing process is not performed.

2. Evaluation of Physical Properties of Magnetic Tape

Various physical properties of the manufactured magnetic tape were evaluated in the same manner as in Example 1.

3. Measurement of SNR

The SNR was measured by the same method as that in Example 1, by using the manufactured magnetic tape. In Examples 2 to 9 and Comparative Examples 5 to 10, the TMR head which was the same as that in Example 1 was used as a servo head. In Comparative Examples 1 to 4, a commercially available spin valve type GMR head (element width of 70 nm) was used as a servo head.

4. Measurement of Resistance Value of Servo Head

A resistance value of the servo head was measured by the same method as that in Example 1, by using the manufactured magnetic tape. As the servo head, the same servo head (TMR head or GMR head) as the servo head used in the measurement of the SNR was used. In Comparative Examples 1 to 4, the GMR head used as the servo head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 1.

TABLE 1

| | Ferromagnetic powder | | Magnetic layer forming Type and amount composition of binding agent (part) | | | | Colloidal silica | | | Burnishing |
|---|---|---|---|---|---|---|---|---|---|---|
| | Average particle size (nm) | σs (A·m²/kg) | Polyurethane resin A | Polyurethane resin B | Vinyl chloride resin | Smoothing process | average particle size | Calendar temperature | Cooling zone staying time | treatment before curing process |
| Comparative Example 1 | 25 | 50 | | 8.0 | 2.0 | Not Performed | 120 nm | 80° C. | Not performed | Not performed |
| Comparative Example 2 | 25 | 50 | | 8.0 | 2.0 | Not Performed | 120 nm | 90° C. | Not performed | Not performed |
| Comparative Example 3 | 25 | 50 | | 8.0 | 2.0 | Not Performed | 80 nm | 90° C. | Not performed | Not performed |
| Comparative Example 4 | 25 | 50 | | 8.0 | 2.0 | Not Performed | 40 nm | 110° C. | Not performed | Not performed |
| Comparative Example 5 | 25 | 50 | | 8.0 | 2.0 | Not Performed | 120 nm | 80° C. | Not performed | Not performed |
| Comparative Example 6 | 25 | 50 | | 8.0 | 2.0 | Not Performed | 120 nm | 90° C. | Not performed | Not performed |
| Comparative Example 7 | 25 | 50 | | 8.0 | 2.0 | Not Performed | 80 nm | 90° C. | Not performed | Not performed |
| Comparative Example 8 | 25 | 50 | | 8.0 | 2.0 | Not Performed | 40 nm | 110° C. | Not performed | Not performed |
| Comparative Example 9 | 25 | 50 | 10.0 | | | Performed | 80 nm | 90° C. | Not performed | Not performed |
| Comparative Example 10 | 25 | 50 | | 8.0 | 2.0 | Not Performed | 80 nm | 90° C. | 1 second | Performed |

TABLE 1-continued

| | | | | | | | | | |
|---|---|---|---|---|---|---|---|---|---|
| Example 1 | 25 | 50 | 10.0 | Performed | 80 nm | 90° C. | 1 second | Performed |
| Example 2 | 25 | 50 | 11.0 | Performed | 80 nm | 90° C. | 1 second | Performed |
| Example 3 | 25 | 50 | 12.0 | Performed | 80 nm | 90° C. | 1 second | Performed |
| Example 4 | 25 | 50 | 15.0 | Performed | 80 nm | 90° C. | 1 second | Performed |
| Example 5 | 27 | 50 | 10.0 | Performed | 80 nm | 90° C. | 1 second | Performed |
| Example 6 | 20 | 50 | 13.0 | Performed | 80 nm | 90° C. | 1 second | Performed |
| Example 7 | 25 | 50 | 12.0 | Performed | 80 nm | 90° C. | 60 seconds | Performed |
| Example 8 | 25 | 50 | 12.0 | Performed | 80 nm | 90° C. | 180 seconds | Performed |
| Example 9 | 25 | 50 | 12.0 | Performed | 40 nm | 110° C. | 180 seconds | Performed |

| | Magnetic layer center line average surface roughness Ra | Logarithmic decrement of magnetic layer | Magnetic cluster | | | Servo head | SNR (dB) | Number of times of occurrence of decrease in resistance value (times) | Rate of decrease in resistance value (%) |
|---|---|---|---|---|---|---|---|---|---|
| | | | Sdc (nm$^2$) | Sac (nm$^2$) | Sdc/Sac | | | | |
| Comparative Example 1 | 2.8 nm | 0.06 | 23000 | 15000 | 1.53 | GMR | 0 | 0 | 0 |
| Comparative Example 2 | 2.5 nm | 0.06 | 23000 | 15000 | 1.53 | GMR | 2.2 | 0 | 0 |
| Comparative Example 3 | 2.0 nm | 0.06 | 23000 | 15000 | 1.53 | GMR | 4.5 | 0 | 0 |
| Comparative Example 4 | 1.5 nm | 0.06 | 23000 | 15000 | 1.53 | GMR | 6.8 | 0 | 0 |
| Comparative Example 5 | 2.8 nm | 0.06 | 23000 | 15000 | 1.53 | TMR | 0.7 | 1 | — |
| Comparative Example 6 | 2.5 nm | 0.06 | 23000 | 15000 | 1.53 | TMR | 3.2 | 3 | — |
| Comparative Example 7 | 2.0 nm | 0.06 | 23000 | 15000 | 1.53 | TMR | 5.5 | 7 | — |
| Comparative Example 8 | 1.5 nm | 0.06 | 23000 | 15000 | 1.53 | TMR | 7.7 | 9 | — |
| Comparative Example 9 | 2.0 nm | 0.06 | 19000 | 15000 | 1.27 | TMR | 7.0 | 10 | — |
| Comparative Example 10 | 2.0 nm | 0.048 | 23000 | 15000 | 1.53 | TMR | 5.5 | 0 | 5 |
| Example 1 | 2.0 nm | 0.048 | 19000 | 15000 | 1.27 | TMR | 7.0 | 0 | 5 |
| Example 2 | 2.0 nm | 0.048 | 16000 | 15000 | 1.07 | TMR | 7.2 | 0 | 5 |
| Example 3 | 2.0 nm | 0.048 | 14000 | 15000 | 0.93 | TMR | 7.5 | 0 | 6 |
| Example 4 | 2.0 nm | 0.048 | 12000 | 15000 | 0.80 | TMR | 7.3 | 0 | 7 |
| Example 5 | 2.0 nm | 0.048 | 24000 | 21000 | 1.14 | TMR | 7.2 | 0 | 5 |
| Example 6 | 2.0 nm | 0.048 | 11000 | 12000 | 0.92 | TMR | 7.5 | 0 | 4 |
| Example 7 | 2.0 nm | 0.033 | 14000 | 15000 | 0.93 | TMR | 7.5 | 0 | 2 |
| Example 8 | 2.0 nm | 0.015 | 14000 | 15000 | 0.93 | TMR | 7.5 | 0 | 1 |
| Example 9 | 1.5 nm | 0.015 | 14000 | 15000 | 0.93 | TMR | 9.3 | 0 | 11 |

As shown in Table 1, in Examples 1 to 9, the servo pattern could be read at a high SNR by using the TMR head as the servo head. In Examples 1 to 9, a significant decrease in resistance value of the TMR head could be prevented.

The invention is effective for usage of magnetic recording for which high-sensitivity reproducing of information recorded with high density is desired.

What is claimed is:

1. A magnetic tape device comprising:
a magnetic tape; and
a servo head,
wherein the servo head is a magnetic head including a tunnel magnetoresistance effect type element as a servo pattern reading element,
the magnetic tape includes a non-magnetic support, and a magnetic layer including ferromagnetic powder and a binding agent on the non-magnetic support,
the magnetic layer includes a servo pattern,
a center line average surface roughness Ra measured regarding a surface of the magnetic layer is equal to or smaller than 2.0 nm,
a logarithmic decrement acquired by a pendulum viscoelasticity test performed regarding the surface of the magnetic layer is equal to or smaller than 0.050, and
a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

2. The magnetic tape device according to claim 1, wherein the logarithmic decrement is 0.010 to 0.050.

3. The magnetic tape device according to claim 2, wherein the center line average surface roughness Ra measured regarding the surface of the magnetic layer is 1.2 nm to 2.0 nm.

4. The magnetic tape device according to claim 1, wherein the center line average surface roughness Ra measured regarding the surface of the magnetic layer is 1.2 nm to 2.0 nm.

5. The magnetic tape device according to claim 1, wherein the magnetic tape includes a non-magnetic layer including non-magnetic powder and a binding agent between the non-magnetic support and the magnetic layer.

6. A head tracking servo method comprising:
reading a servo pattern of a magnetic layer of a magnetic tape by a servo head in a magnetic tape device, wherein the servo head is a magnetic head including a tunnel magnetoresistance effect type element as a servo pattern reading element, the magnetic tape includes a non-magnetic support, and a magnetic layer including ferromagnetic powder and a binding agent on the non-magnetic support, the magnetic layer includes the servo pattern, a center line average surface roughness Ra measured regarding a surface of the magnetic layer is equal to or smaller than 2.0 nm, a logarithmic decrement acquired by a pendulum viscoelasticity test performed regarding the surface of the magnetic layer is equal to or smaller than 0.050, and a ratio Sdc/Sac of an average area Sdc of a magnetic cluster of the magnetic tape in a DC demagnetization state and an average area Sac of a magnetic cluster of the magnetic tape in an AC demagnetization state measured with a magnetic force microscope is 0.80 to 1.30.

7. The head tracking servo method according to claim 6, wherein the logarithmic decrement is 0.010 to 0.050.

8. The head tracking servo method according to claim 7, wherein the center line average surface roughness Ra measured regarding the surface of the magnetic layer is 1.2 nm to 2.0 nm.

9. The head tracking servo method according to claim 6, wherein the center line average surface roughness Ra measured regarding the surface of the magnetic layer is 1.2 nm to 2.0 nm.

10. The head tracking servo method according to claim 6, wherein the magnetic tape includes a non-magnetic layer including non-magnetic powder and a binding agent between the non-magnetic support and the magnetic layer.

* * * * *